Feb. 10, 1931.  S. SMITH  1,792,191
WINDSHIELD VENTILATOR
Filed May 26, 1927  2 Sheets-Sheet 1

INVENTOR
Sydney Smith.
BY
ATTORNEY

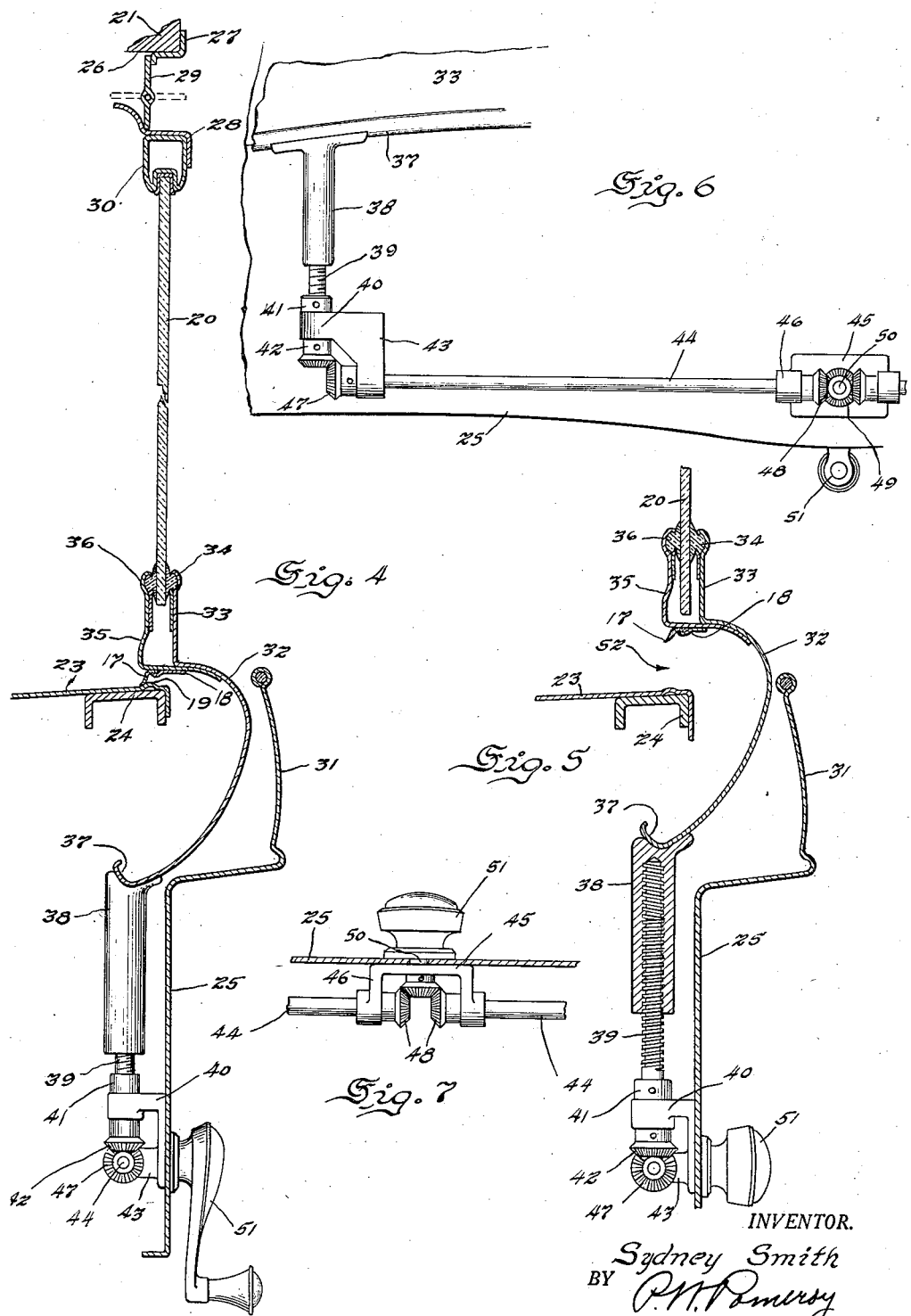

Patented Feb. 10, 1931

1,792,191

UNITED STATES PATENT OFFICE

SYDNEY SMITH, OF SOUTH BEND, INDIANA, ASSIGNOR TO THE STUDEBAKER CORPORATION, OF SOUTH BEND, INDIANA, A CORPORATION OF NEW JERSEY

WINDSHIELD VENTILATOR

Application filed May 26, 1927. Serial No. 194,418.

This invention relates to closures for vehicle bodies and particularly to means for ventilating the same, the principal object being to provide a novel construction whereby air may be introduced into the vehicle body for ventilating the same.

Another object is to provide means whereby a member associated with the windshield and cowl of a vehicle body may be adjusted to different positions to effect different conditions of ventilation.

Another object is to provide means in combination with a windshield which, when moved to a predetermined position, will expose a passageway whereby air may enter the vehicle body forwardly of the instrument board and below the cowl thereof.

Another object is to provide a manually operated mechanical means for moving a member associated with a windshield and a body cowl out of contact with the cowl to provide a passageway between the cowl and member so that air may enter therethrough to the interior of the vehicle body.

Another object is to provide a vehicle body with a bodily movable member in combination with a cowl and windshield thereof which may be actuated by screw means to provide a passageway for the entrance of air, the bodily movable member directing the air into the interior of the body below the cowl and forward of the instrument panel.

Another object is to provide a motor vehicle body having a stationary windshield with a mechanically movable member adapted to be raised to provide a passageway below the windshield for the entrance of air into the body, and with a passageway above the windshield for the exit of air from the body.

A further object is to provide a vehicle body having a stationary windshield with a bodily movable ventilating shield associated with the cowl and windshield and adapted to be raised at will to direct air into the interior of the body, and with a controlled passageway positioned above the windshield adjacent to the top visor, whereby air entering the body may circulate therein and be drawn out of the same through the passageway by the vacuum produced by the flow of air striking the windshield just below the visor and by the air passing over the visor.

These being among the objects of the present invention, the same consists of certain features of construction and combinations of parts to be hereinafter described with reference to the accompanying drawings and then claimed, having the above and other objects in view.

In the accompanying drawings which illustrate a suitable embodiment of the present invention, Figure 1 is a diagrammatic section taken longitudinally of a vehicle body, arrows being shown to illustrate the ventilation of the body.

Figure 4 is an enlarged vertical section taken on the line 4—4 of Figure 3 showing the ventilating shield in closed position.

Figure 5 is a fragmentary section similar to Figure 4 showing the ventilating shield in open position.

Figure 6 is an elevation of the instrument panel and ventilating shield as seen from the front side thereof, showing the screw means for operating the ventilator shield.

Figure 7 is a partial sectional view of the instrument panel showing a portion of the operating means for the ventilating shield.

Figure 1:
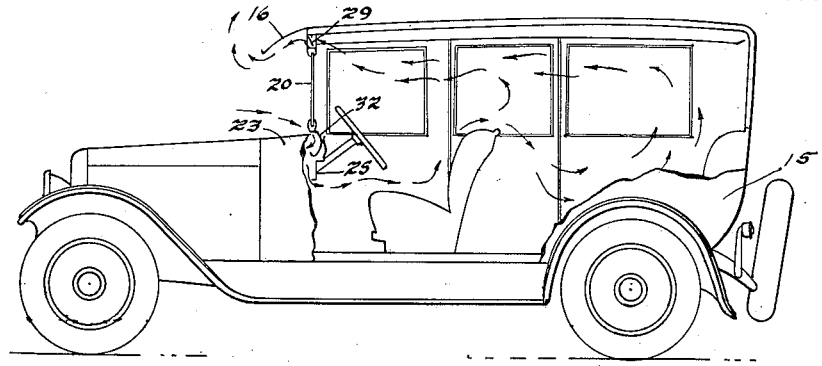

Referring to the accompanying drawings in which like numerals refer to like parts throughout the several views, the portion of the vehicle body 15 shown includes a windshield 20, a top front cross member 21, door posts 22, a cowl 23, a cowl reinforcing channel 24 and an instrument panel 25. The top front cross member 21 extends transversely of the body 15 and is secured at its ends to each front door post 22. The central longitudinal portion of this member is notched out at 26, as shown in Figure 4, and secured to the horizontal face of the notch 26 and to the inner face of the cross member 21 is a longitudinal Z-shaped stamping 27. A similar Z-shaped stamping 28 is secured to the bottom face of the cross member 21 in such a manner that the combination of the two Z-shaped stampings 27 and 28 form a rectangular opening in the cross member 21. The outer flange of the Z-shaped stamping 27 extends downwardly in the notch 26 and the curved outer flange of the Z-shaped stamping 28 extends upwardly and outwardly, but is offset from the outer flange of the stamping 27 so that the upper longitudinal side of a rectangular door 29 pivoted along its longitudinal axis in the notch 26, abuts against the outer side of the downwardly extending flange of the stamping 27, and so that the lower longitudinal side of the door 29 abuts against the inner side of the upwardly extending flange of the stamping 28. The inner side of the flange is the side which faces the interior of the body 15 and the outer side thereof is the side facing the exterior of the body 15. The two opposed flanges of the Z-shaped members 27 and 28 provide positive stops for the opposite sides of the hinged door 29 which permit the door 29 to be rotated about its axis to open a passageway. Secured to the front cross member 21 is a conventional visor 16 which has its lower extremity substantially below the notched opening 26.

The windshield 20 is of the stationary type and is seated at its ends and at its top edge in a conventional channel frame 30, the top portion of which is secured to the horizontal face of the lower Z-shaped stamping 28 and the ends of which are rigidly secured to the sides of the door posts 22. The lower edge of the windshield 20 lies directly over the edge of the cowl 23 but is spaced a substantial distance therefrom so that there is a passageway therebetween, the purpose of which will be described later in the specification.

The instrument panel 25 is secured at its ends to the door posts 22 and the upper portion 31 thereof is offset rearwardly of the lower portion so that it is spaced from the edge of the cowl reinforcing member 24.

Referring particularly to Figure 4, a stamped metal shield 32 is positioned in the space between the edge of the cowl 23 and the upper portion 31 of the instrument panel 25. The upper free end of the metal shield 32 is flanged upwardly at 33 parallel to the windshield glass 20 and is bent back upon itself, the bent back portion being slotted to receive a rubber weatherstrip 34 which bears against the windshield glass 20. Secured to the shield 32 is an auxiliary member 35 which is bent upwardly parallel to the windshield 20 and spaced from the vertical portion 33 of the shield 32. The member 35 is also bent back upon itself and slotted to receive a weather strip 36 directly opposite the weather strip 34, the windshield glass 20 lying between these two weather strips 34 and 36. A longitudinal rubber strip 17 clamped by a stamping 18 to the under side of the member 35 seats against a raised portion 19 on the cowl 23 when the shield 32 is in closed position to prevent water from entering the body 15. The lower portion of the shield 32 is curved away from the instrument panel 25 and terminated in a trough-shaped edge 37 which lies underneath the edge of the cowl 23.

Secured to each end of the shield 32 is a downwardly extending post which threadably receives a screw 39 journaled in a support 40 secured to the instrument panel 25, the screw at one side being provided with right-hand threads and the screw at the other side being provided with left-hand threads. Each of the screws 39 is provided with a fixed collar 41 which seats against the journal support 40, and the end portion of each screw 39 which extends through the support 40 has a bevel gear 42 rigidly secured thereto. Each supporting bracket 40 at opposite ends of the instrument panel 25 is formed with an extending portion 43 which receives one end of a rotatable shaft 44. The back side of the instrument panel 25 has a U-shaped bracket 45 secured thereto, one of the extending legs 46 thereof receiving the other end of the shaft 44. Both ends of the shaft 44 project through their supports 43 and 46 and rigidly secured to the end projecting through the support 43 is a bevel gear 47 which meshes with the gear 42 secured to the screw 39. The end of each shaft 44 projecting through each supporting leg 46 is provided with a bevel gear 48. Both gears 48 mesh with a single bevel gear 49 secured to the end of a shaft 50 journaled in the support 45 and extending through the instrument panel 25.

The ventilating mechanism is operated by means of a crank 51 secured to the end of the shaft 50 projecting through the instrument panel 25. As the crank 51 is rotated, the mechanism comprising the shafts 44 and bevel gears 42, 47, 48 and 49, causes the screws 39 to thread out of the posts 38 secured to the ventilating shield 32, which, because the screws are held against longitudinal movement on the supports 40 by the collars 41, is raised upwardly from the position shown in Figure 4 to a position similar to the position shown in Figure 5. In this figure, the ventilating shield 32 is raised above the cowl 23 to present a passageway 52 from the exterior of the body 15 to the interior thereof.

Figure 2:
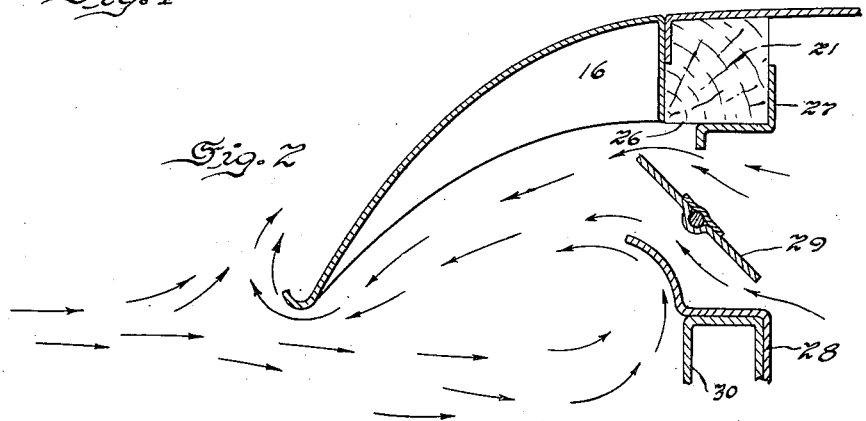
Figure 2 is a partial section taken of that portion of the body comprising the windshield, visor and ventilating passageway, showing how air currents striking the windshield are deflected by the visor to produce an air pocket of low pressure to draw air from the interior of the body through the passageway.
Figure 3:
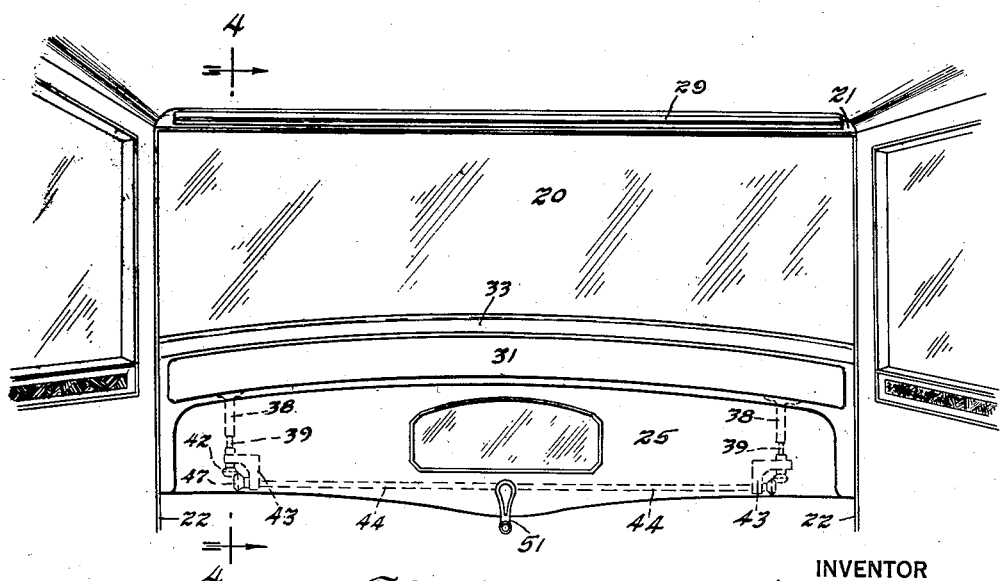
Figure 3 is an enlarged elevation of the instrument panel and windshield of a vehicle body, as seen from the front seat thereof, showing the ventilator operating means in dash and dot outline.

Referring to Figures 1 and 2, which show the passage of air current through the body 15, some of the arrows show the air entering the passageway 52, the shield 32 being in open position, and passing under the cowl 23 back of the instrument panel 25 where it enters the body 15. Other air currents indicated by arrows, are shown to strike the windshield glass 20 below the lower extremity of the top visor 16. The air currents in striking the visor 16 and flowing over the top of the same create a sucking action underneath, which tends to draw the air deflected by the windshield just below the lower extremity of the visor and by the curved flange of the Z-shaped member 28 away from the windshield and to form an area of low pressure adjacent to the opening formed by the notch 26. This low pressure area and the action of the air passing over the visor causes a vacuum and draws the air from the interior of the body 15 out through the opening formed by the notch 26, the pivoted door 29 being open to allow the exit of air from the interior of the body.

From the foregoing description, it is evident that the combination of the ventilating shield 32 below the windshield 20 and the pivoted door 29 in the passageway above the windshield provides a very satisfactory ventilating system for a vehicle body. It is also evident that either of the devices may be used separately, this, of course, being dependent on the degree of ventilation desired.

Formal changes may be made in the specific embodiment of the invention described without departing from the spirit and substance of the broad invention, the scope of which is commensurate with the appended claims.

What I claim is:

1. In a vehicle body, the combination with a cowl and a windshield spaced thereabove, of a vertically movable ventilator shield interposed between said cowl and windshield normally engaging said cowl and said windshield and movable to disengage said cowl.

2. In a vehicle body, the combination with a cowl and a windshield spaced thereabove, of a vertically movable ventilator shield normally engaging said cowl and said windshield, the rear portion of said shield extending rearwardly of and downwardly from the rear edge of said cowl.

3. In a vehicle body, the combination with a cowl and a stationary windshield spaced thereabove, of a movable ventilator shield normally engaging said cowl, the rear portion of said shield extending rearwardly of and downwardly from the rear edge of said cowl, and the lower portion of said windshield slidably receiving the upper portion of said ventilator shield.

4. In a vehicle body, the combination with a cowl and a stationary windshield spaced thereabove, of a movable ventilating shield comprising a forward portion, the bottom thereof normally engaging said body cowl and the top thereof enclosing the lower sides of said windshield, and a rear portion extending rearwardly of and downwardly from the rear edge of said cowl.

5. A ventilator for a vehicle body comprising the combination of a cowl, a windshield spaced thereabove, and a ventilator shield normally engaging said cowl, said ventilator shield having a bifurcated upper portion slidably engaging a portion of the sides of said windshield and a rearward downwardly extending portion spaced from the rear edge of said cowl.

6. A ventilator for a vehicle body comprising the combination of a cowl, a windshield spaced thereabove, and a ventilator shield normally engaging said cowl having a downwardly extending rear portion spaced rearwardly from the edge of said cowl, and a bifurcated forward portion, the arms of said bifurcated portion having weather strips slidably engageable with the sides of said windshield.

7. In a vehicle body, the combination with a cowl and a windshield spaced thereabove, of a vertically movable ventilator shield normally engaging said windshield and said cowl, and means for moving said shield out of engagement with said cowl to provide a ventilating passageway between said cowl and said windshield.

8. In a vehicle body, the combination with a cowl and a windshield spaced thereabove, of a vertically slidable ventilator shield engaging said windshield and normally engaging said cowl the rear portion of said shield extending rearwardly of and downwardly from the rear edge of said cowl, and means for moving said shield vertically out of engagement with said cowl to provide a ventilating passageway between said cowl and said windshield.

9. In a vehicle body, the combination with a cowl, and a windshield spaced thereabove, of a movable ventilator shield normally engaging said cowl and slidably engaging said windshield at opposite sides thereof, the rear portion of said shield extending downwardly at a spaced distance from the rear edge of said cowl, and a manuallly operated control for moving said shield out of engagement with said cowl to provide a ventilating passageway between said cowl and said windshield.

10. In a vehicle body, the combination with a cowl and windshield spaced thereabove, of a movable ventilator shield normally engaging said cowl and slidably engaging said windshield, and means for actuating said ventilator shield comprising downwardly extending posts secured to said shield, longitudinally immovable screws threaded in said posts, and mechanism for rotating said screws to move said shield out of contact with said cowl to provide a ventilating passageway between said cowl and said windshield.

11. In a vehicle body, the combination with a cowl and a windshield spaced thereabove, of a ventilator shield normally engaging said cowl and slidably engaging said windshield, the rear portion of said shield extending downwardly and rearwardly of said cowl and the lower portion of said shield having downwardly extending threaded posts, longitudinally immovable rotatable screws threaded in said posts, and mechanism for rotating said screws for raising said shield above said cowl to provide a pasageway whereby air enters said passageway to ventilate said body.

12. In a vehicle body, the combination with a cowl and a windshield spaced thereabove, of a vertically movable ventilating means normally engaging said cowl and said windshield movable out of contact with said cowl for admitting air into said body, and a second ventilating means above said windshield for exhausting air from said body.

13. In a vehicle body, in combination with a cowl and a windshield spaced thereabove, a vertically movable ventilating shield between said cowl and said windshield adapted to be raised vertically to provide a passageway between said cowl and said windshield for admitting air into said body, a second ventilating passageway above said windshield, and a top visor extending downwardly in front of said second passageway whereby air currents striking said windshield below said passageway and passing over said visor create a vacuum underneath said visor adjacent said passageway for drawing air from the interior of said body.

14. In a vehicle body, in combination with a cowl and a windshield spaced thereabove, a vertically movable ventilating shield between said cowl and said windshield normally engaging said cowl adapted to be raised vertically out of engagement with said cowl to provide a passageway between said cowl and said windshield for admitting air into the interior of said body, a second passageway above said windshield, a deflector adjacent said passageway, and a top visor projecting downwardly in front of said passageway, air currents striking said deflector and passing over said visor creating an area of low pressure adjacent said passageway for drawing air from the interior of said body.

15. A vehicle body provided with an elongated vent or opening between the lower edge of the windshield and the body, a vertically adjustable panel slidably mounted in the body and adapted to normally form a closure for said opening, and adapted when in another position to direct the air currents downward and in front of said panel.

16. A vehicle body provided with an elongated vent or opening between the lower edge of the windshield and the body, a slidable vertically adjustable panel adapted to control the area of said opening, flexible strips on said panel for forming water proof joints when the panel is in certain predetermined positions, and means for adjusting said panel.

17. A vehicle body provided with an elongated opening between the windshield and the body, a panel slidably and adjustably mounted therein, resilient strips on the panel and spaced to engage the windshield and the body when the panel is in closed position, said panel being formed to admit air and force it downwardly when in another position, and a drain trough located on said panel.

Signed by me at South Bend, Indiana, this 24th day of May, 1927.

SYDNEY SMITH.